US008757233B2

(12) United States Patent
Merino Lopez et al.

(10) Patent No.: US 8,757,233 B2
(45) Date of Patent: Jun. 24, 2014

(54) TYRE HAVING A BUILT-IN SELF-SEALING LAYER

(75) Inventors: José Merino Lopez, Riom (FR); Bozena Voge, Cournon d'Auvergne (FR); Michel Ahouanto, Enval (FR)

(73) Assignees: Compagnie Generale des Establissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/514,234

(22) PCT Filed: Dec. 14, 2010

(86) PCT No.: PCT/EP2010/069589
§ 371 (c)(1),
(2), (4) Date: Jul. 17, 2012

(87) PCT Pub. No.: WO2011/073171
PCT Pub. Date: Jun. 23, 2011

(65) Prior Publication Data
US 2012/0273109 A1 Nov. 1, 2012

(30) Foreign Application Priority Data

Dec. 14, 2009 (FR) ..................................... 09 58911

(51) Int. Cl.
| B60C 19/00 | (2006.01) |
| B60C 19/12 | (2006.01) |
| B29D 30/06 | (2006.01) |
| B29C 73/16 | (2006.01) |
| B29C 73/18 | (2006.01) |
| B29C 73/20 | (2006.01) |

(52) U.S. Cl.
CPC ................ B29C 73/18 (2013.01); B29C 73/20 (2013.01); B29D 30/06 (2013.01); B29D 30/0685 (2013.01); Y10S 428/912 (2013.01)
USPC ............ 152/502; 152/503; 156/123; 428/912

(58) Field of Classification Search
CPC ........ B29C 73/18; B29C 73/20; B29D 30/06; B29D 30/0685; B29L 2030/008
USPC ............................ 152/502; 156/123; 428/912
See application file for complete search history.

(56) References Cited

U.S. PATENT DOCUMENTS

| 4,418,093 A | 11/1983 | Gomberg et al. ................... 427/8 |
| 4,664,168 A | 5/1987 | Hong et al. ................... 152/504 |
| 4,801,344 A | 1/1989 | Laurent et al. ................. 156/117 |
| 4,804,436 A | 2/1989 | Debroche et al. ............. 156/441 |
| 4,895,692 A | 1/1990 | Laurent et al. ................. 264/326 |
| 4,913,209 A | 4/1990 | Hong et al. .................... 152/504 |
| 4,963,207 A | 10/1990 | Laurent .......................... 156/117 |
| 5,085,942 A | 2/1992 | Hong et al. .................... 428/492 |
| 5,295,525 A | 3/1994 | Sanda, Jr. ....................... 152/503 |
| 6,420,488 B1 | 7/2002 | Penot .......................... 525/332.7 |
| 7,484,544 B2 * | 2/2009 | Serra et al. ..................... 152/502 |
| 7,959,849 B2 | 6/2011 | Lopez et al. ................... 264/501 |
| 8,151,845 B2 | 4/2012 | Merino-Lopez et al. .. 152/331.1 |
| 2004/0127617 A1 | 7/2004 | Vasseur et al. ................. 524/318 |
| 2008/0264538 A1 | 10/2008 | Merino-Lopez ........... 152/339.1 |
| 2009/0160078 A1 | 6/2009 | Abad et al. ................. 264/178 R |
| 2010/0032070 A1 | 2/2010 | Albert et al. ................... 152/504 |
| 2010/0051158 A1 * | 3/2010 | Albert et al. ................... 152/503 |
| 2010/0300593 A1 * | 12/2010 | Merino Lopez et al. ..... 152/504 |
| 2011/0061782 A1 | 3/2011 | Merino-Lopez et al. ..... 152/503 |
| 2011/0108186 A1 | 5/2011 | Abad et al. .................... 156/114 |

FOREIGN PATENT DOCUMENTS

| EP | 0 243 851 A1 | 11/1987 |
| EP | 0 248 301 A1 | 12/1987 |
| EP | 0 264 600 A1 | 4/1988 |
| EP | 1 034 916 B1 | 4/2003 |
| FR | 2 208 796 | 6/1974 |
| FR | 2 429 682 A1 | 1/1980 |
| FR | 2429682 A1 * | 1/1980 |
| FR | 2 910 382 A1 | 6/2008 |
| FR | 2 910 478 A1 | 6/2008 |
| FR | 2910478 A1 * | 6/2008 |
| FR | 2 925 388 A1 | 6/2009 |
| GB | 1 443 929 | 7/1976 |
| GB | 1443929 * | 7/1976 |
| GB | 2 024 249 A | 1/1980 |
| GB | 2024249 A * | 1/1980 |
| WO | WO 00/05300 A1 | 2/2000 |
| WO | WO 02/088238 A1 | 11/2002 |
| WO | WO 2009000742 A1 * | 12/2008 |

OTHER PUBLICATIONS

PCT/EP2010/069589—International Search Report—Jul. 4, 2012.*
U.S. Appl. No. 13/386,210, filed Jul. 22, 2010.
U.S. Appl. No. 13/395,305, filed Sep. 10, 2010.
U.S. Appl. No. 13/336,076, filed Dec. 23, 2011.
R. Mildenberg et al., *Hydrocarbon Resins*, Chapter 5.5: "Rubber Tires and Mechanical Rubber Goods," New York, VCH, 1997, pp. 141-146.

* cited by examiner

*Primary Examiner* — Ling Choi
*Assistant Examiner* — Ronald Grinsted
(74) *Attorney, Agent, or Firm* — Fitzpatrick, Cella, Harper & Scinto

(57) ABSTRACT

A tire with a built-in self-sealing layer includes an external rubber tread, a carcass reinforcer, a gastight layer arranged towards an inside location relative to the carcass reinforcer, an anti-tack layer arranged furthest towards the inside, location and a self-sealing layer adjacent to the anti-tack layer and arranged towards the inside location relative to the gastight layer. The anti-tack layer includes particles with a shape factor (F=L/E) higher than 5. L represents a first dimension, and E represents a second dimension normal to the first dimension, with L being a longer dimension than E.

16 Claims, 2 Drawing Sheets

TYRE HAVING A BUILT-IN SELF-SEALING LAYER

FIELD OF THE INVENTION

The present invention relates to tyres comprising what is known as a "self-sealing" layer arranged on their interior wall in order to plug any perforations that occur in service and more particularly relates to such tyres in which the self-sealing layer is placed in the green tyre before it is vulcanized.

TECHNICAL BACKGROUND

Numerous documents describe such tyres comprising a self-sealing layer on all or part of their interior surface.

By way of example, document U.S. Pat. No. 4,418,093 describes a method for evenly applying a layer of self-sealing material to the interior wall of a vulcanized tyre by combining a rotation of the tyre followed by oscillatory movements until the self-sealing material is sufficiently crosslinked that it no longer flows.

When the self-sealing layer is applied to the uncured green form of a tyre, one of the problems encountered is due to the highly tacky nature of the self-sealing layer which adheres strongly to the curing membrane during the vulcanizing phase. After the vulcanized tyre leaves the curing mould, bits of the self-sealing layer may remain stuck to the wall of the membrane and thus cause it soon to be scrapped. During this high-temperature vulcanizing phase, ingredients of the self-sealing layer may also migrate into the curing membrane and this may likewise reduce the life thereof. The anti-tack agents conventionally used, such as whitewashes or silicone-containing liquids, are entirely inadequate for solving this problem.

To solve this problem, document U.S. Pat. No. 4,664,168 discloses a tyre with a self-sealing layer incorporated at the time of manufacture of the tyre. This tyre is comprised of an external rubber tread, a carcass reinforcer, a gastight layer arranged on the inside relative to the carcass reinforcer and an anti-tack layer arranged furthest towards the inside. It also is comprised of a self-sealing layer adjacent to the anti-tack layer and arranged on the inside relative to the gastight layer. The anti-tack layer consists of a powder such as talc or zinc stearate.

The anti-tack layer makes the tyre easier to manufacture by limiting direct contact between the self-sealing layer and the tools used for building the green tyre. However, when vulcanizing a green tyre in a mould that has a curing membrane, the extending of the green tyre as a result of the pressure applied by the curing membrane causes the particles to move further apart and leads to the possibility of the self-sealing product coming into direct contact with the curing membrane.

DESCRIPTION OF THE INVENTION

The subject of the invention is a tyre similar to the one already described in which the anti-tack layer consists of particles with a shape factor F=L/E higher than 5, (L representing the length or longest dimension and E the shortest dimension normal to the length; E and L being number averages).

The use of particles with a high shape factor means that the anti-tack layer can retain high efficiency, notably during the vulcanizing of the green tyre in a mould with a curing membrane.

This efficiency is markedly higher than the efficiency that a layer consisting of particles with a lower shape factor, such as spheres, would yield. In the event of extension, each particle moves apart from its neighbours leaving unoccupied passages where detrimental direct contact can occur between the curing membrane or the surface of the tyre-building drum and the self-sealing layer.

The most advantageous method is to apply the layer just at the surface, with no link between the particles, which then adhere to the self-sealing product thanks to the intrinsic tack thereof.

It is advantageous for a traditional anti-tack solution (dusting agent: anti-tack solution or powder suspension, typically including silicone or PDMS) also to be applied. This is necessary in those regions of the internal surface of the tyre which are not covered with self-sealing product and provides an additional anti-tack effect in regions in which fibres or particles with high shape factor are applied.

According to one advantageous embodiment, the anti-tack layer is comprised of particles embedded in a matrix.

This matrix may be identical to the material of the self-sealing layer.

According to a first embodiment, the particles are short fibres with diameters of between 10 and 200 µm and lengths of between 1 and 5 mm.

Such fibres are advantageously selected from the group consisting of cotton fibres, aramid fibres, glass fibres and mixtures thereof.

According to a second embodiment, the particles are lamellar fillers.

These lamellar fillers are advantageously selected from the group consisting of graphites, phyllosilicates and mixtures of such fillers.

Graphites, micas and talcs and mixtures thereof are advantageously chosen.

The thickness of the anti-tack layer is advantageously less than 500 µm, and very advantageously less than 100 µm. It may be between 30 and 50 micrometers.

Such anti-tack layers comprised of particles or fibres may also be used by applying them during the second phase in the manufacture of the tyre, which is the finishing phase just prior to vulcanization.

As described earlier, such anti-tack layers comprised of particles or fibres mean that the tyre can be built practically eliminating all the problems associated with the intrinsically very high tack of the self-sealing layers. The anti-tack layer serves to separate the self-sealing layer on the one hand from the tyre-building drum and then the finishing drum and the curing membrane on the other.

According to one embodiment of the invention, the self-sealing layer may be comprised of at least (where phr means parts by weight per hundred parts of solid rubber) a thermoplastic styrene (or "TPS") elastomer and over 200 phr of an extension oil used to extend the said elastomer.

The TPS may be the predominant elastomer in the self-sealing layer.

The TPS elastomer may be selected from the group consisting of the following block copolymers: styrene/butadiene/styrene (SBS), styrene/isoprene/styrene (SIS), styrene/isoprene/butadiene/styrene (SIBS), styrene/ethylene/butylene/styrene (SEBS), styrene/ethylene/propylene/styrene (SEPS), styrene/ethylene/ethylene/propylene/styrene (SEEPS) and mixtures of these copolymers.

Advantageously, the TPS elastomer is selected from the group consisting of SEBS copolymers, SEPS copolymers and mixtures of these copolymers.

According to another embodiment, the self-sealing layer may be comprised of at least:

by way of predominant elastomer, an unsaturated diene elastomer;

between 30 and 90 phr of a hydrocarbon resin;

a liquid plasticizer the Tg (glass transition temperature) of which is below −20° C., at a content by weight of between 0 and 60 phr; and from 0 to under 30 phr of a filler.

The unsaturated diene elastomer is advantageously selected from the group consisting of polybutadienes, natural rubber, synthetic polyisoprenes, butadiene copolymers, isoprene copolymers and mixtures of such elastomers.

The unsaturated diene elastomer may advantageously be an isoprene elastomer, preferably selected from the group consisting of natural rubber, synthetic polyisoprenes and mixtures of such elastomers.

Advantageously, the unsaturated diene elastomer content is higher than 50 phr and preferably higher than 70 phr.

BRIEF DESCRIPTION OF THE DRAWINGS

All the embodiment details are given in the description which follows, which is supplemented by FIGS. 1 to 3 in which.

DETAILED DESCRIPTION OF SOME EMBODIMENTS OF THE INVENTION

Figure 1:
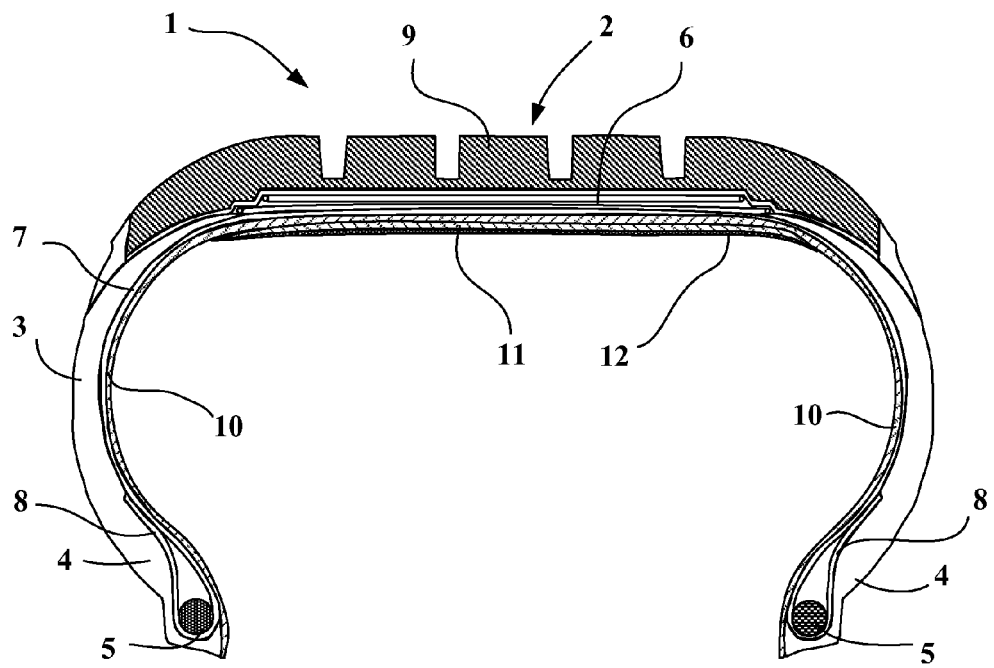
FIG. 1 is a highly schematic (not to any particular scale) radial cross section through a tyre according to one embodiment of the invention.

FIG. 1 schematically depicts a radial cross section through a tyre or pneumatic tyre incorporating a self-sealing layer with an anti-tack layer according to one embodiment of the invention.

This tyre 1 is comprised of a crown 2 reinforced by a crown reinforcement or belt 6, two sidewalls 3 and two beads 4, each of these beads 4 being reinforced with a bead wire 5. The crown reinforcement 6 is surmounted radially on the outside by a rubber tread 9. A carcass reinforcement 7 is wrapped around the two beads wires 5 in each bead 4, the turned-back portion 8 of this reinforcement 7 being, for example, arranged towards the outside of the tyre 1. The carcass reinforcement 7 is, in the way known per se, made up of at least one ply reinforced by cables known as "radial" cables which for example are textile or metal, which means that these cables are laid practically parallel to one another and extend from one bead to the other in such a way as to make an angle of between 80° and 90° to the circumferential midplane (plane perpendicular to the axis of rotation of the tyre and situated mid-way between the two beads 4 and passing through the middle of the crown reinforcement 6). An airtight layer 10 extends from one bead to the other radially on the inside relative to the carcass reinforcement 7.

The tyre 1 is such that its internal wall is comprised of a self-sealing layer 11. According to one preferred embodiment of the invention, the self-sealing layer 11 covers the airtight layer 10 in the region of the crown 2 of the tyre. The self-sealing layer may also extend from the crown region to midway down the sidewalls (equators) of the tyre, or even beyond. The self-sealing layer 11 is covered radially on the inside by an anti-tack layer 12.

The anti-tack layer 12 contains particles with a shape factor higher than 5 laid in a thin layer.

The anti-tack layer 12 prevents nearly all contact between the self-sealing layer and the tyre-building drum and then the curing membrane of the vulcanizing mould.

According to a first embodiment, short fibres can be used by way of anti-tack particles.

For preference, these fibres have a diameter of between 10 and 200 microns and a length of between 1 and 5 mm.

The fibres used may be of natural origin, plant origin (cotton) or mineral origin (glass fibre) or alternatively may be synthetic (aramids).

Their shape factor gives them good coverage even after the wall of the green tyre has extended as a result of its shaping.

According to a second embodiment that is not to the exclusion of the first, lamellar fillers can be used by way of anti-tack particles.

Lamellar fillers (also known as "platy fillers") are well known to those skilled in the art. They have notably been used in tyres to reduce the permeability of the conventional butyl rubber-based gastight layers.

They generally take the form of plates, wafers, sheets or flakes that are stacked, with more or less pronounced anisometry. Their shape ratio (F=L/E) is generally higher than 3, usually higher than 5 or than 10, L representing the length (or longest dimension) and E the average thickness of these lamellar fillers, these means being number averaged. Shape ratios of as high as several tens or even hundreds are commonplace. Their average length is preferably greater than 1 μm (which means that they are then said to be micrometric lamellar fillers), typically of between a few μm (for example 5 μm) and a few hundred μm (for example 500 or even 800 μm).

The lamellar fillers used according to one object of the invention have a shape factor higher than 5. This high shape factor, added to the plate or sheet or flake shape of these fillers, allows them to retain excellent coverage and therefore an excellent protective capability after the green tyre has been shaped.

For preference, the lamellar fillers used according to one object of the invention are selected from the group consisting of graphites, phyllosilicates and mixtures of such fillers. In the phyllosilicate category, particular mention will be made of clays, talcs, micas, kaolins, it being possible for these phyllosilicates to be modified or not for example by a surface treatment; by way of examples of such modified phyllosilicates, particular mention may be made of micas covered with titanium oxide and surfactant-modified clays ("organoclays").

Use is preferably made of lamellar fillers that have low surface energy, which means to say which are relatively apolar, such as those selected from the group consisting of graphites, talcs, micas and mixtures of such fillers, it being possible for the latter to be modified or unmodified, and more preferably still from the group consisting of graphites, talcs and mixtures of such fillers. In the graphites category particular mention may be made of natural graphites, expanded graphites or synthetic graphites.

Examples of micas include the micas marketed by CMMP (Mica-MU®, Mica-Soft®, Briomica®, for example), those marketed by YAMAGUCHI (A51S, A41S, SYA-21R, SYA-21RS, A21S, SYA-41R), vermiculites (notably the Shawatec® vermiculite marketed by CMMP or the Microlite® vermiculite marketed by W. R. Grace), modified or treated micas (for example the Iriodin® range marketed by Merck). Examples of graphites include the graphites marketed by Timcal (the Timrex® range). Examples of talc include the talcs marketed by Luzenac.

The anti-tack layer may be applied to the self-sealing layer by spraying in air or with a water-based or solvent-based anti-tack agent.

Another solution involves embedding the fibres or lamellar fillers in a matrix and applying a thin layer of this matrix containing the fibres or lamellar fillers, of a thickness less than 500 microns, directly on to the self-sealing layer to form a laminate or on to the tyre-building drum as the first stage in building the tyre.

This matrix may be an oil such as a polyisobutylene ("PIB") oil. It is possible to produce a self-sealing layer/anti-tack layer laminate by applying a thin layer of fibres or lamellar fillers to the surface of the self-sealing layer then likewise applying a thin layer of PIB oil to the surface of the particles.

In an alternative embodiment, the particles can be embedded in a material identical to that of the self-sealing layer. The particles are then incorporated into this material during the method of preparing this self-sealing layer and a thin layer less than 500 microns thick and which may be as little as 30 to 50 microns thick of the self-sealing material containing the particles with a shape factor higher than 5 is then applied to the self-sealing layer. The presence of these particles very appreciably reduces the tack (or stickiness) of the self-sealing layer and thus allows the green tyre to be built in the usual way.

According to one embodiment, the self-sealing layer 11 contains a thermoplastic styrene (or "TPS") elastomer and over 200 phr of an extension oil used to extend the elastomer. Thermoplastic styrene elastomers are thermoplastic elastomers that come in the form of styrene-based block copolymers.

Of structure that is somewhere between a thermoplastic polymer and an elastomer they are, in the known way, made up of rigid polystyrene sequences connected by flexible elastomer sequences of, for example, polybutadiene, polyisoprene or poly(ethylene/butylene). These are often three-block elastomers with two rigid segments connected by a flexible segment. The rigid and flexible segments may be arranged in a linear, star or branched configuration.

The TPS elastomer is selected from the group consisting of the following block copolymers: styrene/butadiene/styrene (SBS), styrene/isoprene/styrene (SIS), styrene/isoprene/butadiene/styrene (SIBS), styrene/ethylene/butylene/styrene (SEBS), styrene/ethylene/propylene/styrene (SEPS), styrene/ethylene/ethylene/propylene/styrene (SEEPS) and mixtures of these copolymers.

More preferably, the elastomer is selected from the group consisting of SEBS copolymers, SEPS copolymers and mixtures of these copolymers.

The TPS elastomer may constitute all of the elastomer matrix or the majority by weight (preferably representing over 50 wt %, more preferably over 70 wt %) thereof when it contains one or more other, thermoplastic or otherwise, elastomer(s), for example of the diene type.

Examples of such self-sealing layers and of their properties are disclosed in documents FR 2 910 382, FR 2 910 478 and FR 2 925 388.

Such a self-sealing layer can be preformed by extruding a flat profiled element with appropriate dimensions for applying it to a tyre-building drum. One embodiment is given in document FR 2 925 388.

According to another embodiment, the self-sealing layer 11 is made up of an elastomer composition containing at least, by way of predominant elastomer (preferably representing over 50 phr), an unsaturated diene elastomer, between 30 and 90 phr of a hydrocarbon resin and a liquid plasticizer with a Tg of below −20° C. at a content of between 0 and 60 phr (phr meaning parts by weight per hundred parts of solid elastomer). Another essential feature that it has is that it contains no filler or, at the very most, contains under 30 phr of filler.

Remember that a "diene" elastomer or rubber is to be understood in the known way to mean an elastomer derived at least in part (i.e. a homopolymer or a copolymer) from diene monomers (monomers bearing two carbon-carbon double bonds, conjugated or otherwise).

These diene elastomers can be classified into two categories: saturated or unsaturated. In this application an "unsaturated" (or "essentially unsaturated") diene elastomer means a diene elastomer derived at least in part from conjugated diene monomers and with a content of blocks or units derived from conjugated dienes which is higher than 30% (mol %); thus, this definition excludes diene elastomers such as butyl rubbers or copolymers of dienes and alpha-olefins of the EPDM type which can be qualified as "saturated" or "essentially saturated" diene elastomers because of their low content of blocks of diene origin (always below 15 mol %).

Use is preferably made of an unsaturated diene elastomer of which the content (mol %) of blocks of diene origin (conjugated dienes) is higher than 50%, such a diene elastomer being more preferably selected from the group consisting of polybutadienes (BR), natural rubber (NR), synthetic polyisoprenes (IR), butadiene copolymers (for example butadiene-styrene or SBR copolymers), isoprene copolymers (other than butyl rubber of course) and mixtures of such elastomers.

By contrast with diene elastomers of the liquid type, the unsaturated diene elastomer of the composition is, by definition, solid. For preference, its number-average molecular weight (Mn) is between 100 000 and 5 000 000, more preferably between 200 000 and 4 000 000 g/mol. The Mn value is determined in the known way, for example by SEC: solvent tetrahydrofuran; temperature 35° C.; concentration 1 g/l; flow rate 1 ml/min; solution filtered on a filter of porosity 0.45 µm prior to injection; Moore calibration with test standards (polyisoprene); set of 4 "WATERS" columns in series ("STYRAGEL" HMW7, HMW6E, and 2×HT6E); detection by differential refractometer ("WATERS 2410") and its appropriate operating software ("WATERS EMPOWER").

More preferably, the unsaturated diene elastomer of the composition of the self-sealing layer is an isoprene elastomer. An "isoprene elastomer" in the known way means a homopolymer or copolymer of isoprene or, in other words, a diene elastomer selected from the group consisting of natural rubber (NR), synthetic polyisoprenes (IR), butadiene-isoprene (BIR) copolymers, styrene-isoprene (SIR) copolymers, styrene-butadiene-isoprene (SBIR) copolymers and mixtures of these elastomers.

This isoprene elastomer is preferably natural rubber or a 1,4-cis synthetic polyisoprene; in this synthetic polyisoprene category, those preferably used are polyisoprenes with a content (mol %) of 1,4-cis bonds higher than 90%, more preferably still higher than 95%, notably higher than 98%.

The above unsaturated diene elastomer, notably isoprene elastomer such as natural rubber, may constitute all of the elastomer matrix or the majority by weight (preferably representing over 50%, more preferably still over 70%) thereof when it contains one or more other diene or non-diene elastomer(s), for example of the thermoplastic type. In other words and for preference, within the composition, the content of unsaturated (solid) diene elastomer, notably of isoprene elastomer such as natural rubber, is above 50 phr, more preferably above 70 phr. More preferably still, this content of unsaturated diene elastomer, notably of isoprene elastomer such as natural rubber, is above 80 phr.

According to one particular embodiment, the above unsaturated diene elastomer, particularly when it is an isoprene diene elastomer such as natural rubber, is the only elastomer present in the self-sealing composition. However, according to other possible embodiments, it could also be combined with other (solid) elastomers which represent a minority in terms of weight, whether these be unsaturated diene elastomers (for example BR or SBR) or saturated diene elastomers (for example butyl), or even elastomers other than diene elastomers, for example thermoplastic styrene (TPS) elastomers, for example selected from the group consisting of the following block copolymers: styrene/butadiene/styrene (SBS), styrene/isoprene/styrene (SIS), styrene/butadiene/isoprene/styrene (SBIS), styrene/isobutylene/styrene (SIBS), styrene/ethylene/butylene/styrene (SEBS), styrene/ethylene/propylene/styrene (SEPS), styrene/ethylene/ethylene/propylene/styrene (SEEPS) and mixtures of these copolymers.

Surprisingly, this unsaturated, unfilled (or only very slightly filled) diene elastomer has proved itself capable, following the addition of a hydrocarbon thermoplastic resin in the recommended tight range, of acting as a high-performance self-sealing composition, as is explained in detail in the remainder of the discussion.

The second essential ingredient in the self-sealing composition is a hydrocarbon resin.

The name "resin" is reserved in this application, with the definition known to those skilled in the art, for a compound which is solid at room temperature (23° C.), as opposed to a liquid plasticizer such as an oil.

Hydrocarbon resins are polymers well known to those skilled in the art and are essentially based on carbon and hydrogen and can be used in particular as plasticizers or tackifying agents in polymer matrices. They are by nature miscible (i.e. compatible) at the contents used with the polymer compositions for which they are intended, so that they can act as true diluting agents. They have been described for example in the work entitled "*Hydrocarbon Resins*" by R. Mildenberg, M. Zander and G. Collin (New York, VCH, 1997, ISBN 3-527-28617-9) chapter 5 of which is devoted to their applications, particularly in rubber tyres (5.5. "*Rubber Tires and Mechanical Goods*"). They may be aliphatic, cycloaliphatic, aromatic, hydrogenated aromatic, of the aliphatic/aromatic type, which means to say based on aliphatic and/or aromatic monomers. They may be natural or synthetic, and may or may not be petroleum-based (and if they are, they are also known as petroleum resins).

Their glass transition temperature (T) is preferably higher than 0° C., notably higher than 20° C. (usually between 30° C. and 95° C.).

In the known way, these hydrocarbon resins can also be qualified as thermoplastic resins in as much as they soften under heating and can thus be moulded. They can also be defined in terms of a softening point or softening temperature, which is the temperature at which the product, for example in the form of a powder, clumps together; this data tending to replace the fairly poorly defined melting point for resins in general. The softening point of a hydrocarbon resin is generally around 50 to 60° C. higher than the Tg value.

In the composition of the self-sealing layer, the softening point of the resin is preferably higher than 40° C. (and in particular is between 40° C. and 140° C.), and is more preferably higher than 50° C. (and in particular between 50° C. and 135° C.).

The said resin is used at a weight content of between 30 and 90 phr. Below 30 phr, the anti-puncture performance proves insufficient because the composition is excessively rigid, whereas above and beyond 90 phr carries the risk of the material having insufficient mechanical integrity and also a risk of degraded high-temperature (typically above 60° C.) performance. For these reasons, the resin content is preferably between 40 and 80 phr, and more preferably still at least 45 phr, and notably in the range from 45 to 75 phr.

According to one preferred embodiment of the self-sealing layer, the hydrocarbon resin has at least (any) one, and more preferably all, of the following features:
  a Tg higher than 25° C.;
  a softening point higher than 50° C. (and in particular of between 50° C. and 135° C.);
  a number-average molecular weight (Mn) of between 400 and 2000 g/mol;
  a polydispersity index (Ip) of less than 3 (remember: Ip=Mw/Mn where Mw is the weight-average molecular weight).

More preferably, this hydrocarbon resin has at least (any) one, and more preferably all, of the following features:
  a Tg of between 25° C. and 100° C. (notably of between 30° C. and 90° C.);
  a softening point higher than 60° C., in particular of between 60° C. and 135° C.;
  an average weight Mn of between 500 and 1500 g/mol;
  a polydispersity index Ip of below 2.

The Tg is measured in accordance with standard ASTM D3418 (1999). The softening point is measured in accordance with ISO standard 4625 ("Ring and Ball" method). The macrostructure (Mw, Mn and Ip) is determined by steric exclusion chromatography (SEC): solvent tetrahydrofuran; temperature 35° C.; concentration 1 g/l; flow rate 1 ml/min; solution filtered on a filter of porosity 0.45 μm prior to injection; Moore calibration with polystyrene test standards; set of 3 "WATERS" columns in series ("STYRAGEL" HR4E, HR1 and HR0.5); detection by differential refractometer ("WATERS 2410") and its associated operating software ("WATERS EMPOWER").

By way of examples of such hydrocarbon resins, mention may be made of those selected from the group consisting of cyclopentadiene (CPD for short) or dicyclopentadiene (DCPD for short) homopolymer or copolymer resins, terpene homopolymer or copolymer resins, C5-fraction homopolymer or copolymer resins and mixtures of these resins. Of the above copolymer resins, more particular mention may be made of those selected from the group consisting of (D)CPD/vinylaromatic copolymer resins, (D)CPD/terpene copolymer resins, (D)CPD/C5-fraction copolymer resins, terpene/vinylaromatic copolymer resins, C5-fraction/vinylaromatic copolymer resins and mixtures of these resins.

The term "terpene" here in the known way combines alpha-pinene, beta-pinene and limonene monomers; for preference, use is made of a limonene monomer which compound in the known way comes in the form of three possible isomers: L-limonene (the laevorotatory enantiomer), D-limonene (the dextrorotatory enantiomer), or alternatively dipentene, the racemate of the dextrorotatory and laevorotatory enantiomers. Suitable vinylaromatic monomers include for example styrene, alpha-methylstyrene, ortho-methylstyrene, meta-methylstyrene, para-methylstyrene, vinyltoluene, para-tert-butylstyrene, methoxystyrenes, chlorostyrenes, hydroxystyrenes, vinylmesitylene, divinylbenzene, vinylnaphthalene, any vinylaromatic monomer derived from a $C_9$ fraction (or more generally from a $C_8$ to $C_{10}$ fraction).

More particular mention may be made of the resins selected from the group consisting of (D)CPD homopolymer resins, (D)CPD/styrene copolymer resins, polylimonene resins, limonene/styrene copolymer resins, limonene/D(CPD)

copolymer resins, C5-fraction/styrene copolymer resins, C5-fraction/C9-fraction copolymer resins and mixtures of these resins.

All of the above resins are well known to those skilled in the art and are commercially available, for example sold by the company DRT under the brand name "Dercolyte" in the case of the polylimonene resins, by the company Neville Chemical Company under the brand name "Super Nevtac" or by Kolon under the brand name "Hikorez" as regards the $C_5$-fraction/styrene resins or $C_5$-fraction/$C_9$-fraction resins, or alternatively by the company Struktol under the brand name "40 MS" or "40 NS" or by the company Exxon Mobil under the brand name "Escorez" (mixtures of aromatic and/or aliphatic resins).

The essential feature of the self-sealing composition is that it further contains, at a content of below 60 phr (or in other words of between 0 and 60 phr), a liquid (at 23° C.) plasticizer known as a "low-Tg" plasticizer the purpose of which is notably to soften the matrix by diluting the diene elastomer and the hydrocarbon resin, particularly improving the "cold" (which typically means a temperature of below 0° C.) self-sealing performance; its Tg is, by definition, below −20° C. and preferably below −40° C.

Any liquid elastomer, any extension oil, whether aromatic or nonaromatic by nature, and more generally any liquid plasticizer known for its ability to plasticize elastomers, notably diene elastomers, can be used. At room temperature (23° C.), these plasticizers or these oils, of greater or lesser viscosity, are liquid (which, remember, means substances capable ultimately of adopting the shape of their container), as opposed notably to hydrocarbon resins which are, by nature, solid at room temperature.

Particularly suitable are liquid elastomers with a low number-average molecular weight (Mn), typically of between 300 and 90 000, more generally between 400 and 50 000, for example in the form of depolymerised natural rubber, of liquid BR, SBR or IR, as described for example in patent documents U.S. Pat. No. 4,913,209, U.S. Pat. No. 5,085,942 and U.S. Pat. No. 5,295,525. Mixtures of such liquid elastomers with oils as described below may also be used.

Also suitable are extension oils, notably those selected from the group consisting of polyolefin oils (which means oils derived from the polymerization of olefins, monoolefins or diolefins), paraffin oils, naphthene oils (low or high viscosity, hydrogenated or otherwise), aromatic oils or DAEs (Distillate Aromatic Extracts), MES (Medium Extracted Solvates) oils, TDAE (Treated Distillate Aromatic Extracts) oils, mineral oils, vegetable oils (and their oligomers, e.g. rapeseed, soya, sunflower oils) and mixtures of these oils.

According to one particular embodiment, use is made for example of an oil of the polybutene type, particularly a polyisobutylene ("PIB" for short) oil which has demonstrated an excellent compromise of properties by comparison with the other oils tested, notably by comparison with a conventional oil of the paraffin type. By way of example, PIB oils are marketed notably by UNIVAR under the brand name "Dynapak Poly" (e.g. "Dynapak Poly 190"), by BASF under the brand names "Glissopal" (e.g. "Glissopal 1000") or "Oppanol" (e.g. "Oppanol B12"); paraffin oils are marketed for example by EXXON under the brand name "Telura 618" or by Repsol under the brand name "Extensol 51".

Also suitable as liquid plasticizers are ether, ester, phosphate and sulphonate plasticizers, more particularly those selected from esters and phosphates. By way of preferred phosphate plasticizers, mention may be made of those which contain between 12 and 30 carbon atoms, for example trioctyl phosphate. By way of preferred ester plasticizers particular mention may be made of the compounds selected from the group consisting of trimellitates, pyromellitates, phthalates, 1,2-cyclohexanedicarboxylates, adipates, azelates, sebacates, glycerol triesters and mixtures of these compounds. Of the above triesters, preferred glycerol triesters include those which consist predominantly (more than 50 wt % and more preferably still more than 80 wt %) of a $C_{18}$ unsaturated fatty acid, which means a fatty acid selected from the group consisting of oleic acid, linoleic acid, linolenic acid and mixtures of these acids. More preferably, whether of synthetic or natural origin (the case for example of sunflower or rapeseed vegetable oils), the fatty acid used contains over 50 wt %, more preferably still over 80 wt % oleic acid. Such triesters (trioleates) with a high oleic acid content are well known and have been described for example in application WO 02/088238 (or US 2004/0127617), as plasticizers in tyre treads.

The number-average molecular weight (Mn) of the liquid plasticizer is preferably between 400 and 25 000 g/mol, more preferably still between 800 and 10 000 g/mol. If the Mn weight is too low there is a risk of the plasticizer migrating out of the composition, whereas excessively high weights may cause excessive rigidification of this composition. An Mn weight of between 1000 and 4000 g/mol has proved to be an excellent compromise for the intended applications, particularly for use in a tyre.

The number-average molecular weight (Mn) of the plasticizer can be determined in the known way, notably by SEC, the test specimen being dissolved beforehand in tetrahydrofuran at a concentration of around 1 g/l; the solution is then filtered on a filter of porosity 0.45 μm prior to injection. The equipment is the "WATERS alliance" chromatography set. The elution solvent is tetrahydrofuran, the flow rate 1 ml/min, the system temperature 35° C. and the analysis time 30 min. Use is made of a set of two "WATERS" columns of brand name "STYRAGEL HT6E". The injected volume of polymer sample solution is 100 μl. The detector is a "WATERS 2410" differential refractometer and its associated operating software for exploiting the chromatography data is the "WATERS MILLENIUM" system. The calculated average molecular weights are in relation to a calibration curve produced using polystyrene test standards.

To sum up, the liquid plasticizer is preferably selected from the group consisting of liquid elastomers, polyolefin oils, naphthene oils, paraffin oils, DAE oils, MES oils, TDAE oils, mineral oils, vegetable oils, ether plasticizers, ester plasticizers, phosphate plasticizers, sulphonate plasticizers and mixtures of these compounds. More preferably, this liquid plasticizer is selected from the group consisting of liquid elastomers, polyolefin oils, vegetable oils and mixtures of these compounds.

A person skilled in the art will know, from the description and from the embodiment examples that follow, how to adjust the quantity of liquid plasticizer to suit the particular conditions of use of the self-sealing composition, notably of the tyre in which it is intended to be used.

For preference, the liquid plasticizer content is in a range from 5 to 40 phr, more preferably in a range from 10 to 30 phr. Below the indicated minimum values there is a risk that the elastomer composition will be too rigid for certain applications whereas beyond the recommended maximum values there is a risk of insufficient cohesion of the composition and of impaired self-sealing properties.

The composition of the self-sealing layer has the essential feature of containing no or very little filler, which means of containing from 0 to under 30 phr of filler.

Filler here means any type of filler, whether this be a reinforcing filler (typically using nanometric particles, with a weight-average size preferably of below 500 nm, and notably of between 20 and 200 nm) or whether it be a non-reinforcing or inert filler (typically with micrometric particles, with a weight-average size greater than 1 μm, for example of between 2 and 200 μm).

These fillers, reinforcing or otherwise, are essentially there to give dimensional stability, which means to confer upon the final composition a minimal degree of mechanical integrity. For preference, the more the filler is known to reinforce an elastomer, notably an isoprene elastomer such as natural rubber, the less of it is used in the composition.

Too high a quantity, notably in excess of 30 phr, means that the required minimum properties of flexibility, deformability and flowability can no longer be achieved. For these reasons, the composition preferably contains 0 to under 20 phr, more preferably 0 to under 10 phr of filler.

By way of examples of fillers known to those skilled in the art to be reinforcing fillers particular mention will be made of carbon black nanoparticles or of a reinforcing inorganic filler, or a blend of these two types of filler.

Suitable forms of carbon black for example include all carbon blacks, notably the carbon blacks conventionally used in tyres (said to be tyre-grade carbon blacks). Of these, more particular mention will be made of carbon blacks of (ASTM) grade 300, 600 or 700 (for example N326, N330, N347, N375, N683, N772). Mineral fillers of the silica ($SiO_2$) type, notably precipitated or pyrogenated silicas with a BET surface area of less than 450 $m^2/g$, preferably of 30 to 400 $m^2/g$, are particularly suitable by way of reinforcing inorganic fillers.

By way of examples of fillers known to those skilled in the art to be inert or non-reinforcing, particular mention will be made of microparticles of natural (chalk) or synthetic calcium carbonates, synthetic or natural silicates (such as kaolin, talc, mica), ground silicas, titanium oxides, aluminas or even aluminosilicates. By way of example of lamellar fillers, mention may also be made of graphite particles. Colouring or coloured fillers may advantageously be used to colour the composition to the desired colour.

The physical state of the filler is of little importance, whether it be in the form of powder, microbeads, granules, beads or any other appropriate densified shape. Of course, filler also means mixtures of various fillers, reinforcing and/or non-reinforcing.

A person skilled in the art will know, from the present description, how to adjust the formulation of the self-sealing composition in order to achieve the desired levels of properties and how to adapt the formulation to the intended specific application.

According to one particular and advantageous embodiment, if a reinforcing filler is present in the self-sealing composition, its content is preferably below 5 phr (i.e. comprising between 0 and 5 phr), particularly below 2 phr (i.e. comprising between 0 and 2 phr). Such contents have proven to be particularly favourable to the method of manufacturing the composition while at the same time offering this composition excellent self-sealing performance. More preferably, a content of between 0.5 and 2 phr is used, particularly in the case of carbon black.

The already-described basic ingredients of the self-sealing layer, namely unsaturated diene elastomer, hydrocarbon plasticizing resin, liquid plasticizer and optional filler, are sufficient on their own for the self-sealing composition to perform in full its anti-puncture function with respect to the tyres in which it is used.

However, various other additives may be added, typically in small quantities (preferably at contents of below 20 phr, more preferably of below 15 phr), such as for example anti-tack agents such as anti-UV agents, antioxidants or anti-ozone agents, various other stabilizers, colorants which can advantageously be used to colour the self-sealing composition. Depending on the intended application, fibres, in the form of short fibres or of pulp, may potentially be added to give the self-sealing composition greater cohesion.

According to one preferred embodiment, the self-sealing composition further is comprised of a system for crosslinking the unsaturated diene elastomer. This crosslinking system is preferably a sulphur-based crosslinking system, or in other words, what is known as a "vulcanizing" system.

The sulphur-based vulcanizing system preferably is comprised of, by way of vulcanization activator, a guanidine derivative, which means to say a substituted guanidine. Substituted guanidines are well known to those skilled in the art (see, for example, WO 00/05300): by way of non-limiting examples, mention will be made of N,N'-diphenylguanidine ("DPG" for short), triphenylguanidine or else di-o-tolylguanidine. Use is preferably made of DPG.

In this vulcanizing system, for optimum self-sealing performance, the sulphur content is preferably between 0.1 and 1.5 phr, particularly between 0.2 and 1.2 phr (for example between 0.2 and 1.0 phr) and the guanidine derivative content is itself between 0 and 1.5 phr, particularly between 0 and 1.0 phr (notably in a range from 0.2 to 0.5 phr).

The system does not require the presence of a vulcanization accelerator. According to one preferred embodiment, the composition may therefore be devoid of such an accelerator, or at most, contain under 1 phr thereof, more preferably under 0.5 phr thereof. If such an accelerator is used, mention may be made by way of example of any compound (accelerator known as a primary or as a secondary accelerator) capable of acting as a vulcanization accelerator on diene elastomers in the presence of sulphur, notably accelerators of the thiazole type and derivatives thereof, accelerators of the thiuram or zinc dithiocarbamate type. According to another advantageous embodiment, the above vulcanizing system may be devoid of zinc or zinc oxide (which are known to be vulcanization activators).

According to one other possible embodiment of the self-sealing layer, it is also possible to use a sulphur donor in place of sulphur itself; sulphur donors are well known to those skilled in the art. Typically, the quantity of such a sulphur donor will preferably be adjusted between 0.5 and 10 phr, more preferably between 1 and 5 phr, so as to achieve the aforementioned preferred equivalent sulphur contents.

After curing, a vulcanization system as described hereinabove gives the composition sufficient cohesion without conferring true vulcanization upon it: the level of crosslinking that can be measured, via a conventional swelling method known to those skilled in the art, is in fact around about the detection threshold level.

Apart from the elastomers described above, the self-sealing composition could also, again as a minority fraction by weight with respect to the unsaturated diene elastomer, contain polymers other than elastomers, such as, for example, thermoplastic polymers compatible with the unsaturated diene elastomer.

The composition of the self-sealing layer described hereinabove can be manufactured by any appropriate means, for example by mixing and/or kneading in paddle or open mills, until an intimately and homogeneously mixed blend of its various ingredients is obtained.

However, the following manufacturing problem may arise: in the absence of filler, or at least in the absence of any appreciable amount of filler, the composition is not very cohesive. This lack of cohesion may be such that the tack of the composition, due incidentally to the presence of a relatively high level of hydrocarbon resin, is not compensated for and takes over; this then carries a risk of unwanted adherence to the mixing tools, which may be detrimental under industrial working conditions.

In order to alleviate the above problems, the self-sealing composition, when it contains a vulcanization system, can be prepared using a method involving the following steps:

a) first of all a masterbatch is produced which contains at least the unsaturated diene elastomer and between 30 and 90 phr of the hydrocarbon resin, mixing these various components together in a mill, at a temperature or up to a temperature known as the "hot mixing temperature" or "first temperature" which is above the softening point of the hydrocarbon resin;

b) at least the crosslinking system is then incorporated into the said masterbatch, mixing everything together, in the same mill or in a different mill, at a temperature or up to a temperature known as the "second temperature" which is kept below 100° C., in order to obtain said self-sealing composition.

The first and second temperatures described above are of course those of the masterbatch and of the self-sealing composition respectively which can be measured in situ, rather than the setpoint temperatures of the mills themselves.

What is meant here by definition by "masterbatch" is the mixture of at least the diene elastomer and the hydrocarbon resin, which mixture is the precursor of the final self-sealing composition ready for use.

The liquid plasticizer can be incorporated at any time, in full or in part, notably during the production of the masterbatch itself (in which case before, during or after the hydrocarbon resin is incorporated into the diene elastomer), "hot" (which means at a temperature higher than the softening point of the resin) or at a lower temperature or, for example, after manufacture of the masterbatch (in which case before, during or after the addition of the crosslinking system).

Various additives, whether these are intended for the masterbatch itself (for example a stabilizer, a colorant or an anti-UV agent or antioxidant, etc.) or for the final self-sealing composition for which the masterbatch is intended, may optionally be incorporated into this masterbatch.

Such a method proves to be particularly well suited to rapid production, under working conditions that are acceptable for an industrial standpoint, of a high-performance self-sealing composition, it being possible for this composition to contain high levels of hydrocarbon resin without notably requiring the use of a liquid plasticizer at a particularly high content.

It is during step a) of hot mixing that the diene elastomer is brought into contact with the hydrocarbon resin to produce the masterbatch. In the initial state, which means before it comes into contact with the elastomer, the resin may be in the solid state or in the liquid state. For preference, for better mixing, the solid diene elastomer is brought into contact with hydrocarbon resin in the liquid state. In order to achieve that all that is required is for the resin to be heated to a temperature above its softening point. Depending on the type of hydrocarbon resin used, the hot-mixing temperature is typically above 70° C., usually above 90° C., for example between 100° C. and 150° C.

It is preferable for the liquid plasticizer to be introduced, at least in part, during step a) of producing the masterbatch itself, more preferably in this case either at the same time as the hydrocarbon resin or after the latter has been introduced. According to one particularly advantageous embodiment, a mixture of the hydrocarbon resin and of the liquid plasticizer may be prepared before this mixture is incorporated into the diene elastomer.

Step b) of incorporating the crosslinking system is performed at a temperature preferably below 80° C., and moreover preferably below the softening point of the resin. Thus, depending on the type of hydrocarbon resin used, the mixing temperature for step b) is preferably below 50° C., more preferably between 20° C. and 40° C.

An intermediate step of cooling the masterbatch in order to bring its temperature down to a value below 100° C., preferably below 80° C., notably below the softening point of the resin, may be inserted if necessary between above steps a) and b), specifically before the introduction (in step b)) of the crosslinking system into the already-prepared masterbatch.

When a filler such as carbon black is used, this can be introduced during step a), which means at the same time as the unsaturated diene elastomer and the hydrocarbon resin, or alternatively during step b), which means at the same time as the crosslinking system. It has been found that a very low proportion of carbon black, preferably of between 0.5 and 2 phr, further improves the mixing and manufacture of the composition, and its ultimate extrudability.

Figure 3:
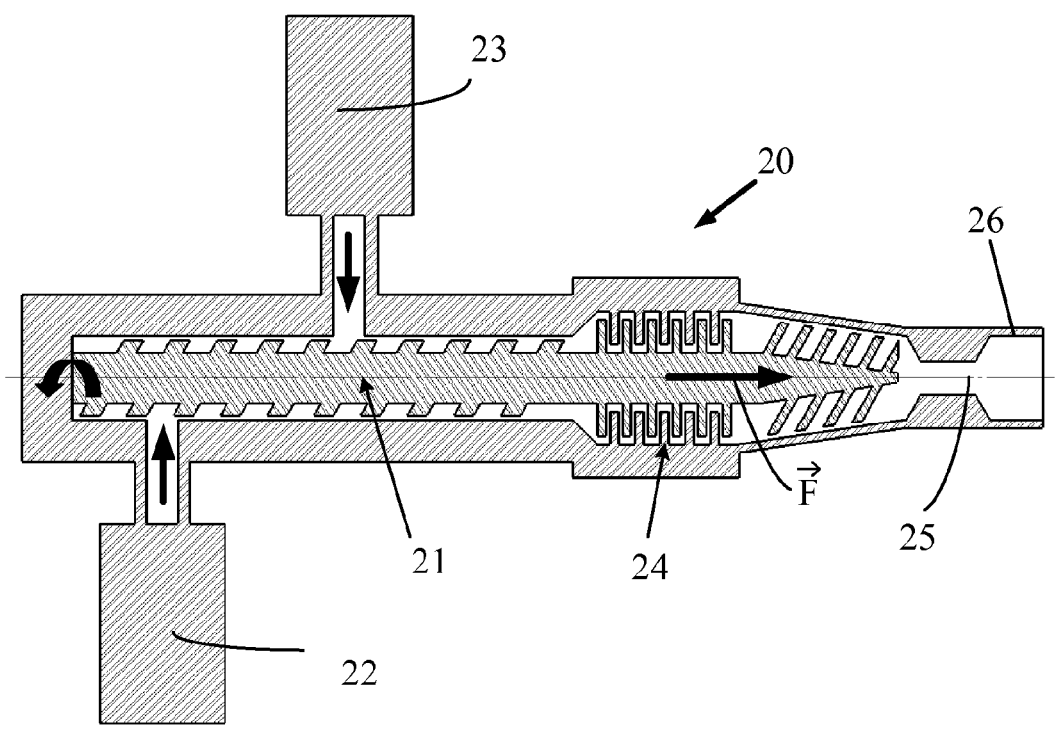
FIG. 3 is a diagram of a screw-type extruder-mixer.

Step a) of producing the masterbatch is preferably performed in a screw-type extruder mixer as depicted schematically and in a simple way for example in FIG. 3.

This FIG. 3 shows a screw-type extruder mixer 20 essentially comprising an extruder screw 21 (for example a mono-screw), a first metering pump 22 for the (solid) diene elastomer and at least one second metering pump 23 for the (solid or liquid) resin and the liquid plasticizer. The hydrocarbon resin and the liquid plasticizer can be introduced for example using a single metering pump, if they have already been mixed together beforehand, or alternatively they can be introduced separately using a second pump and a third pump (for simplicity, the third pump has not been depicted in FIG. 3) respectively. The metering pumps 22, 23 allow the pressure to be increased while retaining control over the metering and the initial characteristics of the materials, dissociating the functions of metering (the elastomer, the resin and the liquid plasticizer) and mixing, further offering better control over the process.

The products, driven by the extrusion screw, are closely mixed under very high shear provided by the rotating of the screw, thus progressing through the mill, for example as far as a part 24 known as the "homogenizer chopper", on leaving which zone the final masterbatch 25 thus obtained, progressing in the direction of the arrow F, is finally extruded through a die 26 allowing the product to be extruded at the desired dimensions.

The masterbatch thus extruded, and ready for use, is then transferred on to and cooled on, for example, an external open mill for the introduction of the crosslinking system and the optional filler, the temperature inside the said external mill being kept below 100° C., preferably below 80° C. and also preferably below the softening point of the resin. Advantageously, the cylinders of the above mill are cooled, for example, by the circulation of water at a temperature of below 40° C., preferably below 30° C., to avoid any unwanted adhesion of the composition to the walls of the mill.

It is possible for the masterbatch to be shaped directly as it leaves the extrusion device 20 to make it easier to transfer and/or to introduce into the external mill. It is also possible to employ continuous feed of the external open mill.

By virtue of the preferred specific device and method both described hereinabove, it is possible to prepare the composition of the self-sealing layer under satisfactory industrial conditions without the risk of tool contamination due to unwanted adhesion of the composition to the walls of the mills.

The airtight layer 10 (of thickness 0.7 to 0.8 mm) in one particular embodiment is based on butyl rubber and has a formulation that is conventional for an "inner liner" which, in a conventional tyre, usually defines the radially interior face of the tyre intended to protect the carcass reinforcement from the diffusion of air originating from the space inside the tyre. This airtight layer 10 therefore allows the tyre 1 to be inflated and kept under pressure; its airtightness properties guarantee a relatively low loss of pressure, allowing the tyre to be kept inflated, under normal operating conditions, for a satisfactory period of time, normally several weeks or several months.

Figure 2:
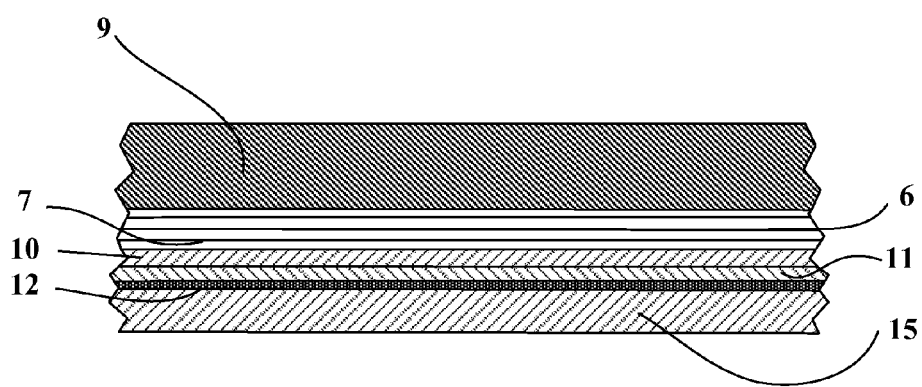
FIG. 2 is a partial radial cross section through a green tyre according to one embodiment of the invention.

The tyre of FIG. 1 can be produced, as indicated in FIG. 2, by incorporating a self-sealing layer 11 into an unvulcanized green tyre 1 using a tyre-building drum 15 and the other techniques that are commonplace in the building of tyres.

More specifically, when the anti-tack layer 12 is made of a layer of particles, it can be applied directly to the surface of the self-sealing layer before that is applied to a tyre-building drum. This application can be done under gravity, by spraying in suspension in air, in suspension in a liquid which then evaporates (water for example). The laminate made up of the two, self-sealing and anti-tack, layers is then applied to the tyre-building drum, the latter layer being placed in contact with the periphery of the tyre-building drum 15. All the other conventional components of the tyre are then applied in succession.

With reference to FIG. 2, the self-sealing layer 11 preformed beforehand using any known technique, for example extrusion or calendering, has a thickness preferably greater than 0.3 mm, more preferably of between 0.5 and 10 mm (particularly for tyres of passenger vehicles between 1 and 5 mm). The airtight layer 10 is then laid on top of the self-sealing layer, followed by the carcass ply 7.

In a two-stage manufacturing process, the green tyre is therefore shaped into the form of a torus. The anti-tack layer 12 made up of particles with a high shape factor follows the movements of the green tyre without disrupting them.

After shaping, the crown plies and the tread are laid on the green tyre. The thus completed green tyre is placed in a curing mould and vulcanized. During vulcanizing, the anti-tack layer protects the curing membrane of the mould from any contact with the self-sealing layer.

On leaving the curing mould, the particles of the anti-tack layer 12 remain attached to the self-sealing layer 11. That allows the tread to detach from the curing membrane without any difficulty.

The particles of the anti-tack layer could also be applied just prior to the vulcanizing of the green tyre.

The method of manufacturing the green tyre is then as follows:
 a layer (or skim) of the self-sealing layer is laid out flat on a tyre-building drum;
 all of the conventional products for forming a green tyre are applied in succession to the said drum;
 the said green tyre is removed from the said tyre-building drum;
 an anti-tack agent is applied at least to that part of the interior wall of the said green tyre that is not covered by the self-sealing layer;
 an anti-tack layer comprised of particles with a shape factor higher than 5 is applied to the interior wall of the self-sealing layer of the said green tyre;
 the green tyre is placed in a vulcanizing mould;
 the said green tyre is vulcanized to obtain a tyre; and
 the said tyre is removed from the said vulcanizing mould.

It is advantageous for a traditional anti-tack solution (anti-tack agent: anti-tack solution or powder suspension, typically including silicone or PDMS) also to be applied. This is needed in those regions of the internal surface of the tyre that are not covered with self-sealing product and supplements the anti-tack agent in the regions in which fibres are deposited.

The application of particles and fibres with high shape factors is performed using the same means.

When the anti-tack layer is embedded in a matrix, a laminate is preferably made first of all with the self-sealing layer which is then applied to the surface of the tyre-building drum in a single operation as indicated above.

The tyre of FIG. 1 can also be manufactured using a rigid core that dictates the shape of the interior cavity of the tyre. In this method, the anti-tack layer is therefore the first to be applied to the surface of the core, either at the same time as the self-sealing layer or successively, followed by all of the other components of the tyre. The order in which layers are applied to the core is dependent on the order required by the final design. The components of the tyre are laid directly in their final position, without undergoing any shaping at any time in the building operation. This building operation may notably use the devices described in patent EP 0 243 851 for laying carcass reinforcer threads, EP 0 248 301 for laying crown reinforcers and EP 0 264 600 for laying rubber compounds. The tyre can be moulded and vulcanized in the way explained in U.S. Pat. No. 4,895,692. The presence of the anti-tack layer makes it possible, as in the case of the curing membrane, for the tyre to be separated easily from the core on completion of the vulcanizing phase.

The self-sealing layer 11 shown in FIG. 1 corresponds to the second embodiment described above. This layer consists of a self-sealing composition containing the three essential ingredients which are natural rubber (100 phr), around 50 phr of hydrocarbon resin ("Escorez 2101" by Exxon Mobil, with a softening point of around 90° C.), and around 15 phr of liquid polybutadiene ("Ricon 154" by Sartomer Cray Valley, with an Mn of around 5200); it furthermore contains a very low quantity (1 phr) of carbon black (N772).

The above self-sealing composition was prepared using a monoscrew extruder (L/D=40) as depicted schematically in FIG. 3 (already discussed earlier); the three basic ingredients (NR, resin and liquid plasticizer) were mixed at a temperature (of between 100 and 130° C.) higher than the softening point of the resin. The extruder used had two different feeds (hoppers) (one for NR and the other for the resin and liquid plasticizer which had been mixed beforehand at a temperature of around 130 to 140° C.) and one pressurized liquid injection pump for the resin/liquid plasticizer mixture (injected at a temperature of around 100 to 110° C.); when the elastomer, the resin and the liquid plasticizer were intimately mixed in this way, it was found that the unwanted tackiness of the composition decreased very significantly.

Similar results were obtained using by way of self-sealing layer a composition containing a thermoplastic styrene TPS elastomer as previously described.

The above extruder was fitted with a die allowing the masterbatch to be extruded at the desired dimensions to an external open mill, for the final incorporation of the other ingredients, namely the vulcanization system based on sulphur (for example 0.5 or 1.2 phr) and DPG (for example 0.3 phr) and carbon black (at a content of 1 phr), at a low temperature kept at a value below +30° C. (the cylinders of the mill being cooled by the circulation of water).

The self-sealing layer 11 therefore arranged between the airtight layer 10 and the cavity of the tyre affords the tyre effective protection against losses of pressure due to accidental puncturing by allowing these punctures to self-seal.

If a foreign body such as a nail penetrates the structure of the tyre, for example a wall such as a sidewall 3 or the crown 2 of the tyre 1, the composition acting as a self-sealing layer experiences several stresses. In reaction to these stresses and thanks to its advantageous deformability and elasticity properties, the said composition creates an airtight region of contact all around the body. It is of little importance whether the contour or profile of this foreign body is uniform or even, the flexibility of the self-sealing composition allows it to infiltrate into openings of extremely small size. This interaction between the self-sealing composition and the foreign body makes the region affected by the latter airtight.

If the foreign body is accidentally or deliberately removed, a puncture remains: this puncture is liable to create a greater or lesser leakage, depending on its size. The self-sealing composition, subjected to the effect of hydrostatic pressure, is flexible and deformable enough that, by deforming, it plugs the puncture, preventing inflation gas from escaping. In the case of a tyre in particular, it has been found that the flexibility of the self-sealing composition was able without any problem to withstand the loadings of the surrounding walls, even during phases of deformation of the laden tyre driving along.

One particular problem may be encountered when removing the foreign body after driving some distance on it. In such instances, during driving, the nail or the foreign body is subjected to high stresses which enlarge the size of the initial hole in the wall of the tyre. As a result, when the foreign body is actually removed, the material of the self-sealing layer, driven by the inflation pressure of the tyre, may be expelled through the entire wall of the tyre to form a projection or plug on the outside. This plug usually plugs the leak satisfactorily, but it is very exposed on the outside of the tyre and if it is torn off this is likely to cause the tyre to flatten gradually or instantly. Another consequence of the formation of a plug is that it reduces the amount of material of this self-sealing layer that remains on the inside of the tyre, thus impairing the effectiveness of this layer.

When an anti-tack layer as previously described is positioned on the surface of the self-sealing layer on the same side as the internal cavity of the tyre, this anti-tack layer mechanically strengthens the self-sealing layer and encourages the self-sealing material to remain confined inside the wall of the tyre. The material of the self-sealing layer is therefore not completely expelled through the hole and no plug is formed on the outside. The very low extension rigidity of these anti-tack layers allows them to envelop puncturing foreign bodies without reducing the effectiveness of the self-sealing layer. A veritable synergy between the self-sealing layer and the anti-tack layer containing particles with a shape factor higher than 5 is thus observed.

Under testing, tyres of the passenger vehicle type, of the 205/55 R16 size (the Michelin "Energy 3" make) were tested. These tyres as previously described incorporate a self-sealing layer 11 covered by an anti-tack film comprised of a layer of cotton fibres. The self-sealing layer is 3 mm thick.

One of the mounted and inflated tyres was punctured eight times, each puncture measuring 5 mm in diameter, through the tread and the crown block on the one hand, and through the sidewalls on the other, using perforators which were immediately removed.

Unexpectedly, this tyre was able to be run on the drum at 150 km/h under a nominal load of 400 kg with no loss of pressure, for over 1500 km, beyond which distance running was halted.

The same was done to another tyre, this time leaving the puncturing objects in place for a week. The same excellent result was achieved.

Without any self-sealing composition and under the same conditions as described above, the tyre thus punctured loses its pressure in under a minute, becoming completely unfit for driving.

Endurance testing was also performed on tyres according to the invention, identical to the previous ones, but which drove for 750 km, up to a speed of 150 km/h, this time leaving the perforators in place in their punctures. When the perforators were extracted (or became expelled as a result of driving), these tyres of the invention were able to be run on the drum with no loss of pressure, under the same conditions as before (distance of 1500 km covered at a speed of 150 km/h and under a nominal load of 400 kg).

The invention is not restricted to the examples described and depicted and various modifications can be made thereto without departing from its scope as defined by the attached claims.

The invention claimed is:

1. A tyre with a built-in self-sealing layer, the tyre comprising:
   an external rubber tread;
   a carcass reinforcer;
   a gastight layer arranged towards an inside location relative to the carcass reinforcer;
   an anti-tack layer arranged further towards the inside location than the gastight layer; and
   a self-sealing layer adjacent to the anti-tack layer and arranged between the anti-tack layer and the gastight layer,
   wherein the anti-tack layer includes particles with a shape factor $F=L/E$ higher than 5, with
   L representing a first dimension,
   E representing a second dimension normal to the first dimension, and
   L being longest amongst the first dimension, the second dimension, and a third dimension.

2. A tyre according to claim 1, wherein the anti-tack layer includes particles embedded in a matrix.

3. A tyre according to claim 2, wherein a material of the matrix is identical to a material of the self-sealing layer.

4. A tyre according to claim 1, wherein the particles include short fibres with diameters of between 10 and 200 microns and lengths of between 1 and 5 mm.

5. A tyre according to claim 4, wherein the fibres are selected from the group consisting of cotton fibres, aramid fibres, glass fibres, and mixtures thereof.

6. A tyre according to claim 1, wherein the particles are lamellar fillers.

7. A tyre according to claim 6, wherein the lamellar fillers are selected from the group of fillers consisting of graphites, phyllosilicates, and mixtures thereof.

8. A tyre according to claim 6, wherein the lamellar fillers are selected from the group of fillers consisting of graphites, talcs, micas, and mixtures thereof.

9. A tyre according to claim 1, wherein a thickness of the anti-tack layer is less than 500 μm.

10. A tyre according to claim 9, wherein the thickness of the anti-tack layer is less than 100 μm.

11. A tyre according to claim 10, wherein the thickness of the anti-tack layer is between 30 and 50 μm.

12. A tyre according to claim 1, wherein the self-sealing layer includes:
   a thermoplastic styrene ("TPS") elastomer, and
   over 200 phr of an extension oil used to extend the TPS elastomer, in which phr corresponds to parts by weight per hundred parts of elastomer.

13. A tyre according to claim 12, wherein the TPS elastomer is a predominant elastomer in the self-sealing layer.

14. A tyre according to claim 1, wherein the self-sealing layer includes:
   an unsaturated diene elastomer as a predominant elastomer,
   between 30 and 90 phr of a hydrocarbon resin, and
   0 to under 30 phr of a filler, in which phr corresponds to parts by weight per hundred parts of elastomer.

15. A tyre according to claim 14, wherein the unsaturated diene elastomer is selected from the group of elastomers consisting of polybutadienes, natural rubbers, synthetic polyisoprenes, butadiene copolymers, isoprene copolymers, and mixtures thereof.

16. A tyre according to claim 14, wherein the unsaturated diene elastomer is an isoprene elastomer selected from the group of elastomers consisting of natural rubbers, synthetic polyisoprenes, and mixtures thereof.

* * * * *

UNITED STATES PATENT AND TRADEMARK OFFICE
CERTIFICATE OF CORRECTION

PATENT NO. : 8,757,233 B2  
APPLICATION NO. : 13/514234  
DATED : June 24, 2014  
INVENTOR(S) : Merino Lopez et al.

Page 1 of 1

It is certified that error appears in the above-identified patent and that said Letters Patent is hereby corrected as shown below:

Title Page:
Item [73] ASSIGNEE

"Compagnie Generale Des Establissements Michelin" should read
--Compagnie Generale Des Etablissements Michelin--.

Signed and Sealed this
Third Day of May, 2016

Michelle K. Lee
*Director of the United States Patent and Trademark Office*